(12) United States Patent
Broker et al.

(10) Patent No.: US 8,300,807 B2
(45) Date of Patent: Oct. 30, 2012

(54) COMPUTING ISOGENIES BETWEEN GENUS-2 CURVES FOR CRYPTOGRAPHY

(75) Inventors: Reinier M. Broker, Woodinville, WA (US); Kristin E. Lauter, Redmond, WA (US); David Gruenewald, Sydney (AU)

(73) Assignee: Microsoft Corp., Redmond, WA (US)

( * ) Notice: Subject to any disclaimer, the term of this patent is extended or adjusted under 35 U.S.C. 154(b) by 907 days.

(21) Appl. No.: 12/350,222

(22) Filed: Jan. 7, 2009

(65) Prior Publication Data

US 2010/0172491 A1    Jul. 8, 2010

(51) Int. Cl.
  *H04L 9/00* (2006.01)
(52) U.S. Cl. ........................................ 380/28
(58) Field of Classification Search .............. 380/28
  See application file for complete search history.

(56) References Cited

U.S. PATENT DOCUMENTS

| | | | |
|---|---|---|---|
| 2002/0018560 A1* | 2/2002 | Lauter et al. | 380/28 |
| 2006/0120528 A1* | 6/2006 | Weng | 380/255 |
| 2006/0206554 A1* | 9/2006 | Lauter et al. | 708/492 |

* cited by examiner

*Primary Examiner* — Cordelia Zecher
(74) *Attorney, Agent, or Firm* — Lyon & Harr, LLP; Katrina A. Lyon

(57) ABSTRACT

This cryptographic curve generation technique provides a faster way of constructing a genus 2 curve. The technique provides a procedure to compute isogenies between genus 2 curves over finite fields. Instead of looping over possible roots, as is typically done when solving Igusa class polynomials, the technique only finds one root and then applies the isogenies to find the others. The technique computes a set of polynomials that define all isogenies. To do this, for a given root of an Igusa class polynomial over a finite field, the technique computes a value of a small modular function $f$. To the value of this function $f$, the technique applies an isogeny to find an isogenous $f$-value. The technique then transforms the $f$-value back into an Igusa value. Once the Igusa class polynomials are solved they can be used to generate a genus 2 curve which can be used in cryptographic applications.

19 Claims, 8 Drawing Sheets

US 8,300,807 B2

COMPUTING ISOGENIES BETWEEN GENUS-2 CURVES FOR CRYPTOGRAPHY

Over the last 20 years, cryptography has become increasingly important. Every day society uses cryptography for such purposes as making cellular phone calls, ordering merchandise on-line, conducting on-line banking, and so forth. There are various kinds of cryptography, and one popular variant uses elliptic curves. An elliptic curve is a mathematical object which has exactly the structure and properties that are needed in cryptography.

Many protocols for elliptic curves have been standardized for use in cryptography. In the late 1980's, genus 2 curves were proposed for use with cryptography. A genus 2 curve is a mathematical object whose properties and structure are well suited for cryptography. However, unlike the case of elliptic curves (which are genus 1 curves), protocols for these genus 2 curves have not been standardized.

All known methods to construct a genus 2 curve for cryptographic purposes rely on the computation of three auxiliary polynomials with rational coefficients. These polynomials have the form $X^5+aX^4+bX^3+dX^2+eX+f$, where a, b, c, d, e, f are fractions. The number 5 occurring in $X^5$ is a random choice. This number will typically be much larger. In order to use genus 2 curves for cryptography it is necessary to compute these aforementioned three polynomials. Traditionally, these polynomials are called Igusa class polynomials. Computation of Igusa class polynomials is very difficult and computationally expensive.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The cryptographic curve generation technique described herein provides a faster way of constructing a genus 2 curve for use in cryptography. Although the properties of genus 2 curves are well suited for cryptography, some curves are better than others. The technique makes it easier to find a 'good curve' that can be used for cryptography. More specifically, in one embodiment, the technique provides an explicit procedure to compute isogenies (e.g., (3,3)-isogenies) between genus 2 curves over finite fields. This speeds up the computation of an Igusa class polynomial in the following way: instead of looping over possible roots, as is typically done when solving Igusa class polynomials, the technique only finds one root and then applies the isogenies, mappings between curves, to find the other roots. The technique computes a set of polynomials that define all isogenies. To do this, for a given root of an Igusa class polynomial over a finite field, the technique computes a value of a small modular function $f$. In one embodiment that modular function is a Siegel modular function. To the value of this small modular function $f$, the technique applies an isogeny, for example, a (3,3)-isogeny, to find an isogenous $f$-value. The technique then transforms the $f$-value back into an Igusa value. Once the Igusa class polynomial is computed it can be used to generate a genus 2 curve, which in turn can be used to generate a cryptographic key if desired.

In the following description of embodiments of the disclosure, reference is made to the accompanying drawings which form a part hereof, and in which are shown, by way of illustration, specific embodiments in which the technique may be practiced. It is understood that other embodiments may be utilized and structural changes may be made without departing from the scope of the disclosure.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the cryptographic curve generation technique, reference is made to the accompanying drawings, which form a part thereof, and which show by way of illustration examples by which the cryptographic curve generation technique described herein may be practiced. It is to be understood that other embodiments may be utilized and structural changes may be made without departing from the scope of the claimed subject matter.

1.0 Cryptographic Curve Generation Technique

The following section provides an exemplary operating environment in which the cryptographic curve generation technique can be practiced, an explanation of the technique, exemplary processes employing the technique, and an exemplary architecture wherein the cryptographic curve generation technique can be practiced. Details of complex mathematical computations, theorems and proofs are provided in Appendix A.

1.2 Exemplary Operating Environment

The cryptographic curve generation technique described herein creates a curve that can be used for cryptographic applications. For example, the technique can be used to create a cryptographic key for cryptographic applications.

Typically, a curve-based cryptosystem is based on a group whose size is known to the cryptosystem designer, but is unknown and believed difficult to determine for attackers of the cryptosystem. The curve-based encryption and decryption illustrated as an example herein refers to encryption and decryption that uses keys that are generated based on aspects or characteristics of a mathematical curve. This exemplary cryptosystem is based on the curve being used and a secret group size. In the case of the cryptographic curve generation technique described herein, the curve is the Jacobian of a genus 2 curve, and the secret group size is the size of the group of points on the Jacobian of the genus 2 curve.

Curve-based cryptosystems can be used to encrypt any of a wide variety of information. For example, the following paragraphs describe an exemplary cryptosystem with respect to generation of a "short" signature or product identifier, which is a code that allows validation and/or authentication of a machine, program or user, for example. The signature can be a "short" signature in that it uses a relatively small number of characters.

Figure 1:
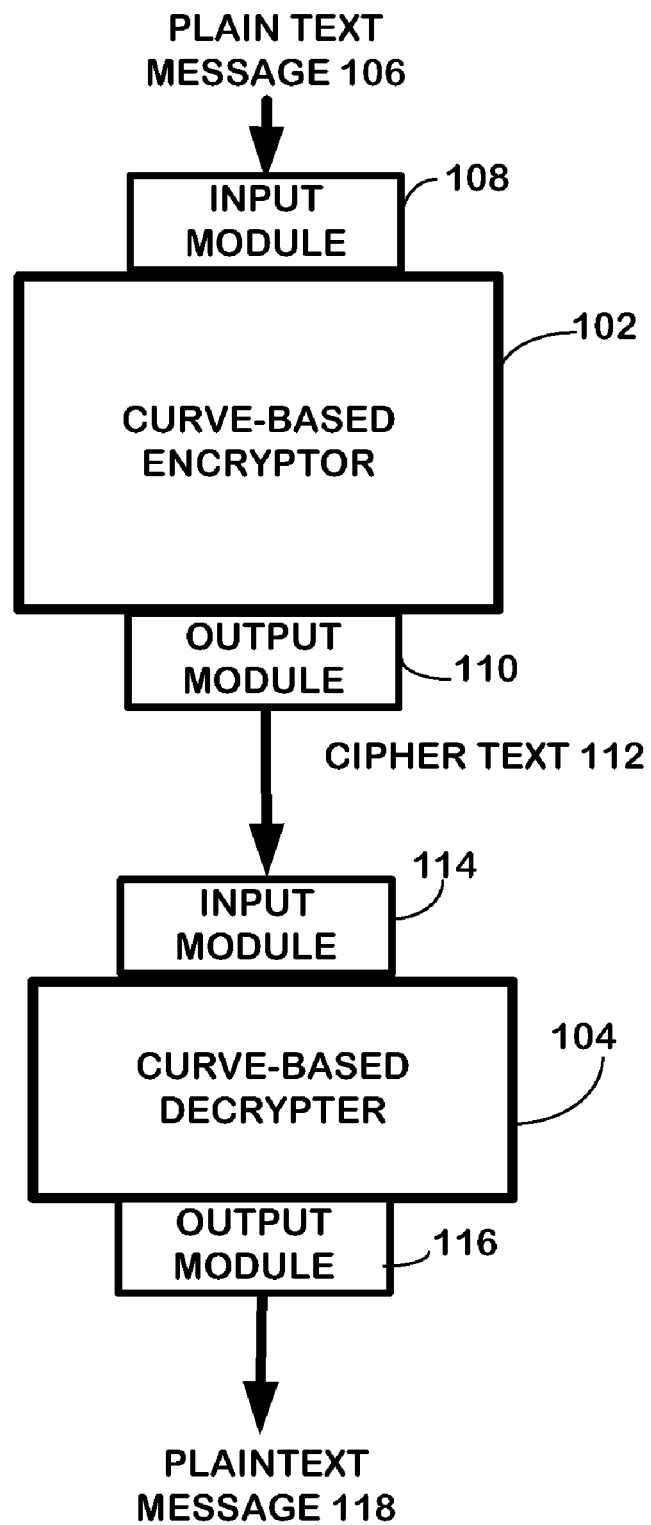
FIG. 1 is a block diagram illustrating an exemplary cryptosystem in which the cryptographic curve generation technique can be practiced.

With this in mind, reference is made to FIG. 1, which is a block diagram illustrating an exemplary cryptosystem 100 in accordance with certain embodiments of the cryptographic curve generation technique described herein. Cryptosystem 100 includes an encryptor 102 and a decryptor 104. A plaintext message 106 is received at an input module 108 of encryptor 102, which is a curve-based encryptor that encrypts message 106 based on a public key generated based on a secret group size (known only by decryptor 104). This secret group size can be the size of the group of points on the Jacobian of the curve being used. Plaintext message 106 is typically an unencrypted message, although encryptor 102 can encrypt any type of message. Thus, message 106 may alternatively be encrypted or encoded by some other component (not shown) or a user. Message 106 may need to be converted to a divisor before encryption and un-converted after decryption (not shown).

An output module 110 of encryptor 102 outputs the encrypted version of plaintext message 106, which is ciphertext 112. Ciphertext 112 can then be communicated to decryptor 104, which can be implemented, for example, on a computer system remote from a computer system on which encryptor 102 is implemented. Given the encrypted nature of ciphertext 112, the communication link between encryptor 102 and 104 need not be secure. The communication link can be any of a wide variety of public and/or private networks implemented using any of a wide variety of conventional public and/or proprietary protocols, and including both wired and wireless implementations. Additionally, the communication link may include other non-computer network components, such as hand-delivery of media including ciphertext or other components of a product distribution chain.

Decryptor 104 receives ciphertext 112 at input module 114 and, being aware of the secret group size used to encrypt message 106 (as well as the necessary exponent), is able to readily decrypt ciphertext 112 to recover the original plaintext message 106, which is output by output module 116 as plaintext message 118. Decryptor 104 is a curve-based decryptor that decrypts the message based on the size of the group of points on the Jacobian of a curve (in the case of the present cryptographic curve generation technique this is a genus 2 curve). The size of the group used by the decryptor is the same as the size of the group used by the encryptor 102. This will be discussed in more detail below.

As mentioned above, encryption and decryption are performed in cryptosystem 100 based on a secret, which is the size of the group of points on the Jacobian of a curve. This secret is known to decryptor 104, and a public key generated based on the secret is known to encryptor 102. This knowledge allows encryptor 102 to encrypt a plaintext message that can be decrypted only by decryptor 104. Other components, including encryptor 102, which do not have knowledge of the secret cannot decrypt the ciphertext (although decryption may be technically possible, it is not computationally feasible). Similarly, decryptor 104 can also generate a message using the secret and based on a plaintext message, a process referred to as digitally signing the plaintext message. This signed message can then be communicated to other components, such as encryptor 102, which can in turn verify the digital signature based on the public key.

Figure 2:
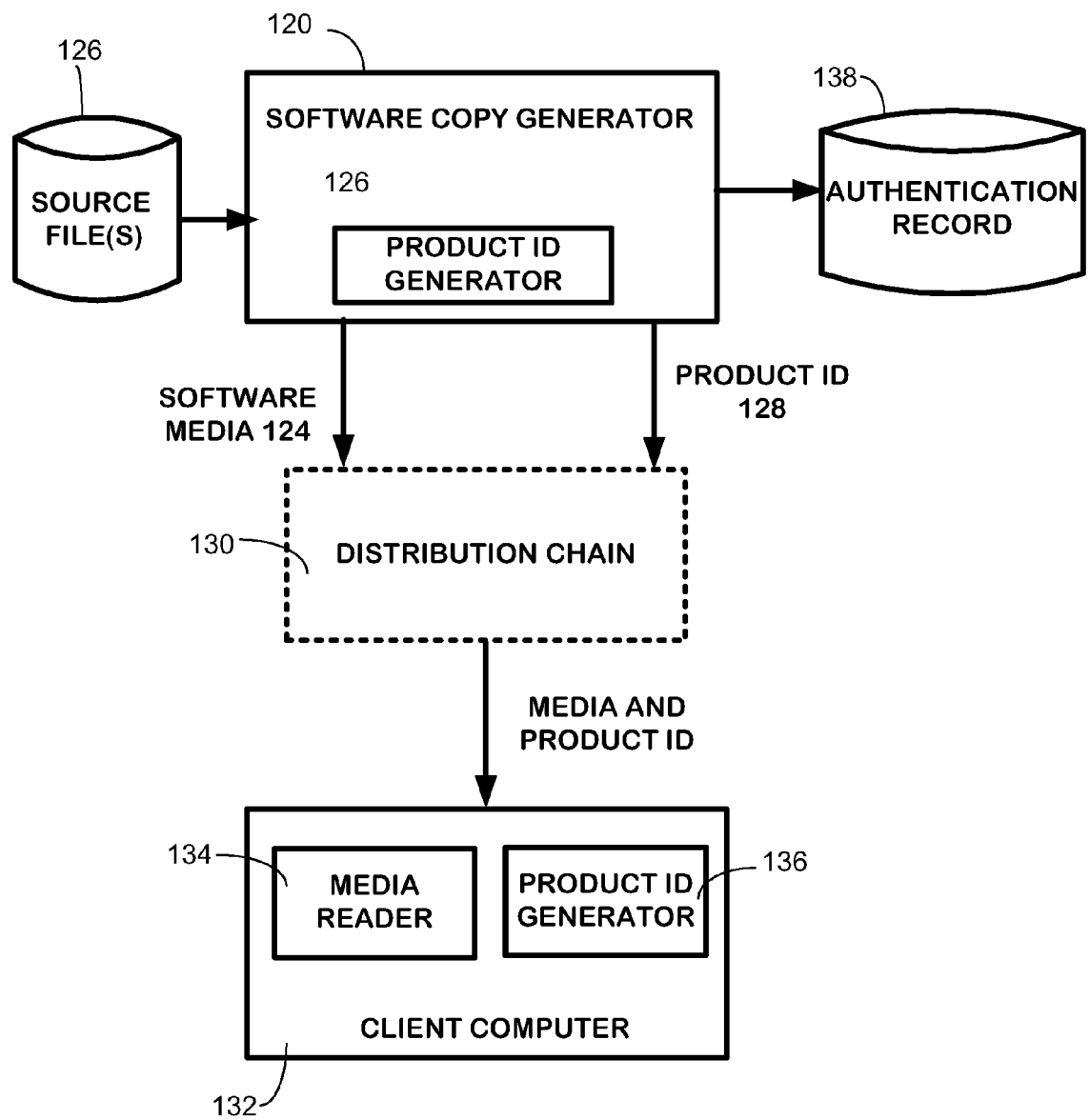
FIG. 2 illustrates an exemplary system using a product identifier to validate software in which exemplary embodiments of the cryptographic curve generation technique can be practiced.

FIG. 2 illustrates an exemplary system using a product identifier to validate software in which one embodiment of the present cryptographic curve generation technique can be practiced. FIG. 2 illustrates a software copy generator 120 including a product identifier (ID) generator 122. Software copy generator 120 produces software media 124 (e.g., a CD-ROM, DVD (Digital Versatile Disk), etc.) that contains typically all the files needed to collectively implement a complete copy of one or more application programs, (e.g., a word processing program, a spreadsheet program, an operating system, a suite of programs, and so forth). These files are received from source files 126, which may be a local source (e.g., a hard drive internal to generator 120), a remote source (e.g., coupled to generator 120 via a network), or a combination thereof. Although only a single generator 120 is illustrated in FIG. 2, typically multiple such generators operate individually and/or cooperatively to increase the rate at which software media 124 can be generated.

Product ID generator 122 generates a product ID 128 that can include numbers, letters, and/or other symbols. Generator 122 generates product ID 128 using the curve-based encryption process described herein. The product ID 128 is typically printed on a label and affixed to either a carrier containing software media 124 or a box into which software media 124 is placed. Alternatively, the product ID 128 may be made available electronically, such as a certificate provided to a user when receiving a softcopy of the application program via an on-line source (e.g., downloading of the software via the Internet). The product ID can serve multiple functions. First, the product ID can be cryptographically validated in order to verify that the product ID is a valid product ID (and thus allowing, for example, the application program to be installed). Additionally, the product ID can optionally serve to authenticate the particular software media 124 to which it is associated.

The generated software media 124 and associated product ID 128 are then provided to a distribution chain 130. Distribution chain 130 represents any of a variety of conventional distribution systems and methods, including possibly one or more "middlemen" (e.g., wholesalers, suppliers, distributors, retail stores (either on-line or brick and mortar), etc.). Regardless of the manner in which media 124 and the associated product ID 128 are distributed, eventually media 124 and product ID 128 are purchased (e.g., licensed), by the user of a client computer 132.

Client computer 132 includes a media reader 134 capable of reading software media 124 and installing the application program onto client computer 132 (e.g., installing the application program on to a hard disk drive (not shown) of client computer 132). Part of this installation process involves entry of the product ID 128. This entry may be a manual entry (e.g., the user typing in the product ID via a keyboard), or alternatively an automatic entry (e.g., computer 132 automatically accessing a particular field of a license associated with the application program and extracting the product ID therefrom). Client computer 132 also includes a product ID validator 136 which validates, during installation of the application program, the product ID 128. This validation is performed using the curve-based decryption techniques, for example, as described herein.

If validator 136 determines that the product ID is valid, then an appropriate course of action is taken (e.g., an installation program on software media 124 allows the application to be installed on computer 132). However, if validator 136 determines that the product ID is invalid, then a different course of action is taken (e.g., the installation program terminates the installation process preventing the application program from being installed).

Product ID validator 136 also optionally authenticates the application program based on the product ID 128. This authentication verifies that the product ID 128 entered at computer 132 corresponds to the particular copy of the application be accessed. The authentication can be performed at different times, such as during installation, or when requesting product support or an upgrade. Alternatively, this authentication may be performed at a remote location (e.g., at a call center when the user of client computer 132 calls for technical support, the user may be required to provide the product ID 128 before receiving assistance).

If the application program manufacturer desires to utilize the authentication capabilities of the product ID, then the product ID generated by generator 122 for each copy of an application program is unique. This uniqueness is created by assigning a different initial number or value to each copy of the application program. This initial value can then be used as a basis for generating the product ID.

The unique value associated with the copy of the application program can be optionally maintained by the manufacturer as an authentication record 138 (e.g., a database or list) along with an indication of the particular copy of the application program. This indication can be, for example, a serial number embedded in the application program or on software media 124, and may be hidden in any of a wide variety of conventional manners.

Alternatively, the individual number itself may be a serial number that is associated with the particular copy, thereby allowing the manufacturer to verify the authenticity of an application program by extracting the initial value from the product ID and verifying that it is the same as the serial number embedded in the application program or software media 124.

Appropriate action can be taken based on whether the product ID is authenticated. These actions can vary, depending on the manufacturer's desires and/or action being taken at computer 132 that caused the authentication check to occur. For example, if a user is attempting to install an application program then installation of the program may be allowed only if the authentication succeeds. By way of another example, the manufacturer's support technicians may provide assistance to a user of computer 132 only if the authentication succeeds, or an upgrade version of the application program may be installed only if authentication of the previous version of the application program succeeds.

Figure 3:
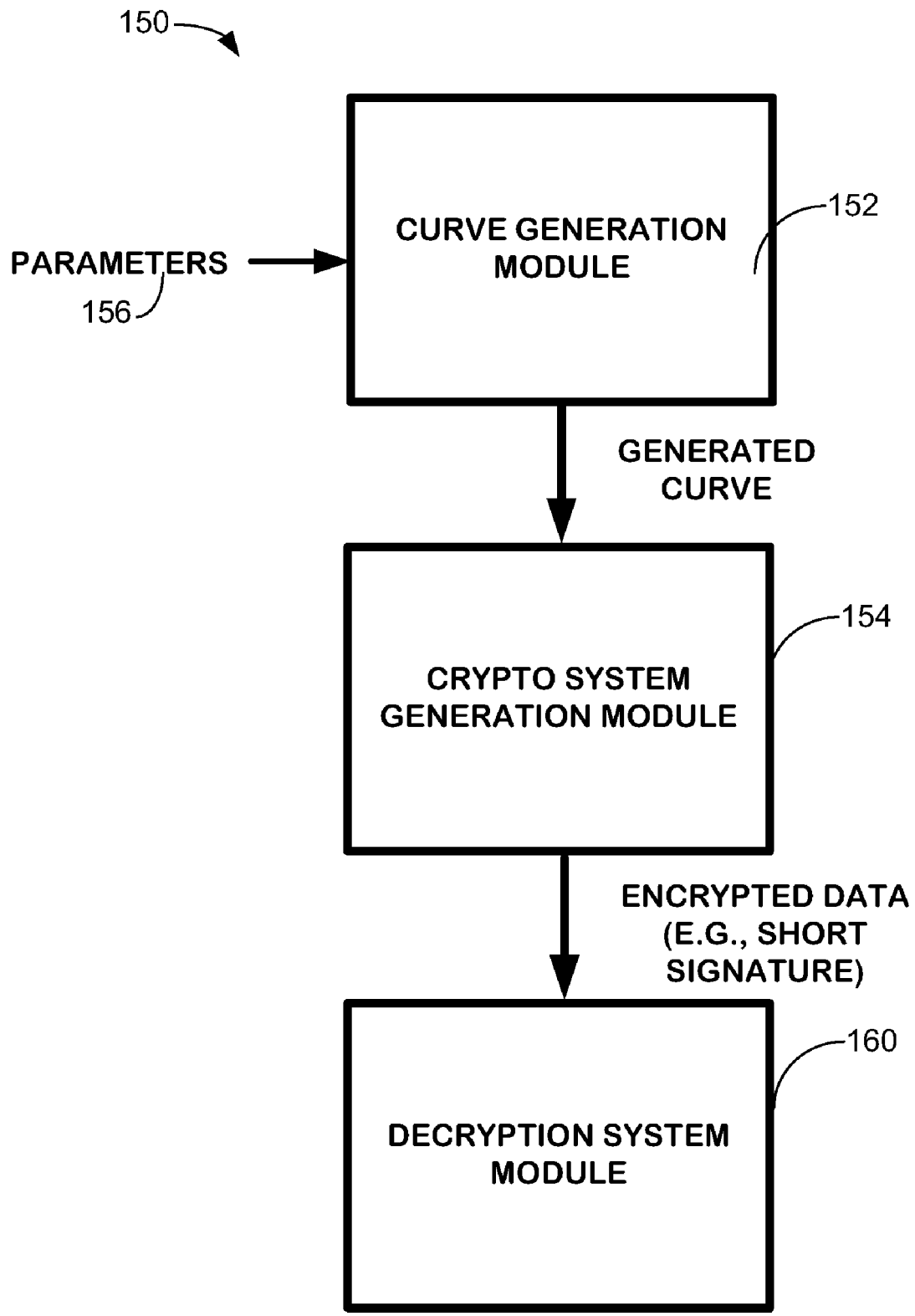
FIG. 3 illustrates an exemplary cryptographic system generator in which exemplary embodiments of the cryptographic curve generation technique can be practiced.

FIG. 3 illustrates an exemplary cryptographic system generator in accordance with certain embodiments of the cryptographic curve generation technique. The generator system 150 generates a cryptosystem based on a secret that is the size of a group of points on the Jacobian of a genus 2 curve. The cryptosystem generated by system 150 can be used, for example, to implement the system 100 in FIG. 1 or the product ID based system of FIG. 2. The system 150 includes a curve generation module 152 and a cryptographic system generation module 154. Curve generation module 152 receives a set of one or more parameters 156 as inputs and creates a curve to be used based on the parameters 156. In one embodiment, parameters 156 include an indication of the genus of the curve and a size (e.g., in bits) that the product identifier should be. Curve generation module 152 can then generate a genus-2 curve based on these parameters as will be discussed in greater detail below. Curve generation module 152 then provides the generated genus 2 curve to cryptographic system generation module 154. Cryptographic system generation module 154 generates the cryptographic system, determining the group and the size of the group (which is the secret that is being maintained).

For illustration purposes, a decrypt system module 160 is also depicted as receiving the short signature as input and performing the counter part to crypto system generation module 154. It should be noted that the curve generated by the cryptographic curve generation technique can be used with any type of curve-based encryption and decryption protocol.

Curve generation module 152 can be configured to create a genus 2 curve given by $y^2=f(x)$. referred to herein as the equation C, over a finite field $F_p$, where p is a prime number and where f is a polynomial of degree 2g+1 and g is the genus of the genus 2 curve. Given this generated curve, cryptographic system generation module 154 determines the Jacobian J(C) over the finite field $F_p$ for the curve. The group of points on the Jacobian J(C) is denoted by $J(C)(F_p)$, and the order of $J(C)(F_p)$, also referred to as the size of $J(C)(F_p)$ or the number of elements in J(C)(Fp), is secret. The order of $J(C)(F_p)$ can be selected by the cryptosystem designer and made available to cryptosystem generation module 154 (e.g., as one of parameters 156, or alternatively separately). An element of the group J(C) is called a divisor on the curve, and it is given as a pair of polynomials a(x) and b(x).

For example, let q be an odd prime or prime power and $F_p$ denote the finite field of q elements. If g is a positive integer, for example, then a genus 2 curve can be given as an equation $y^2=f(x)$ over $F_p$, where the degree of f(x) is 2g+1 or 2g+2 and f(x) has no repeated factors. Then g is called the genus of the curve. Assume for simplicity that the degree of f(x) is 2g+1 for the remainder of this explanation. Elements of the Jacobian of the curve are degree-zero divisors, and can be represented by two polynomials a(x), b(x) in $F_q[x]$ such that:

degree(b)<degree(a)≦g; and    (1)

a(x) divides f(x)−b(x)$^2$    (2)

For ease of understanding, an element of the Jacobian of a curve can be thought of as a multiset with at most g points on the curve, where g is the genus of the curve. These points on the curve can lie in an algebraic extension of the finite field, and the multiset never includes both a point and its negative. The generation of the Jacobian of a curve, as well as performing operations in the Jacobian, are well-known to those skilled in the art.

Knowing how to perform group operations on the Jacobian, an element P of the Jacobian can be raised to a publicly available exponent e (that is, $P^e$), with this result $P^e$ also being on the Jacobian. The value $P^e$ can then be transmitted over a non-secure communication link (or stored in a non-secure manner), and the privacy of the value P maintained because an attacker cannot readily recover P without knowing the secret group size (the order of $J(C)(F_p)$). If the group size is known, however, then a value d can be readily determined so that the value $P^e$ can be raised to the value d (that is, $(P^e)^d$), which recovers the value of P. It is very difficult (computationally infeasible) to recover the value of P based on the value $P^e$ without knowing the secret group size.

The value of e can be any value, but larger prime values typically provide greater security. The value of d can be readily determined by solving for d such that $e \cdot d = 1 \mod |G|$, where |G| refers to the secret group size (that is, to the order of $J(C)(F_p)$).

A point P on the Jacobian can be digitally signed in an analogous manner. The point P is raised to the secret exponent d (that is, $P^d$). The value $P^d$ can then be communicated or otherwise made available to another device that knows the publicly available exponent e. The value of P can then be recovered by raising the value $P^d$ to the value e (that is, $(P^d)^e$). However, without knowing the secret group size, a false value $P^d$ that resulted in a valid value of P could not be created by an attacker because the attacker could not generate the value d.

The above paragraphs having been dedicated to explaining how curves are used to generate a group for use in cryptography (e.g., in order to generate a secret group size), the following section will be dedicated to an explanation of generating a suitable genus 2 curve for cryptography in accordance with some embodiments of the cryptographic curve generation technique described herein.

1.2 Genus 2 Curve Generation for Cryptography

As discussed above, in one exemplary embodiment of the technique, curve generation can take place in a curve generation module, such as, for example, curve generation module 152. The present cryptographic curve generation technique provides a faster way of constructing a genus 2 curve for use in cryptography. Although the properties of genus 2 curves are well suited for cryptography, some curves are better than others. The technique makes it easier to find a 'good curve' that can be used for cryptography. The following paragraphs provide an overview of how the technique generates curves. In particular, the following paragraphs provide an explanation of how a set of Igusa class polynomials are expediently solved and used to generate a genus 2 curve.

By was of background, all known methods to construct a genus 2 curve for cryptographic purposes rely on the computation of three auxilliary polynomials with rational coefficients. These polynomials have the form $X^5 + aX^4 + bX^3 + dX^2 + eX + f$, where a, b, c, d, e, f are fractions. The number 5 occurring in $X^5$ is a random choice. This number is typically be much larger. In order to generate a genus 2 curve for use with cryptography the mathematical problem that needs to be solved is the computation of these three polynomials. Traditionally, these polynomials are called Igusa class polynomials. Computation of Igusa class polynomials is very computationally expensive.

The cryptographic curve generation technique described herein speeds up the computation of Igusa class polynomials. It computes the polynomials 'modulo various primes' and then combines the information modulo primes to recover the Igusa class polynomial itself.

The combining method which is employed in one embodiment of the cryptographic curve generation technique is called the Chinese remaindering approach. The Chinese remaindering approach uses various remainders in order to find missing elements in a set of equations. This can be illustrated as follows. Suppose that one has a positive number x of which one knows three things: it is less than 20, if one divides it by 3 then the remainder is 2, and if one divides it by 7 then the remainder is 4. It is possible to compute x using the following method. The fact that the remainder upon division by 3 is 2, means that x is either 2, 5, 8, 11, 14, 17 or 19. However, the fact that the remainder upon division by 7 is 4 means that x is either 4, 11 or 18. It can be seen that the only number that appeared in both lists is 11, so x had to be 11. This method is called the 'Chinese remainder approach'. Instead of computing the 3 Igusa class polynomials, the technique employs the Chinese remaindering approach and computes each of the Igusa class polynomials modulo a prime in order to generate a suitable genus 2 curve for use with cryptography. In practice, such a polynomial modulo a prime p looks like $X^5 + aX^4 + bX^3 + dX^2 + eX + f$. The coefficients a, b, c, d, e, f are not fractions anymore. These coefficients are now integers between 0 and p−1. For a given prime p, the technique finds these coefficients a, b, c, d, e, f.

Therefore, to reiterate, one wants to construct a genus 2 curve that can be used for cryptography. By well-known mathematical techniques, this reduces to computing three Igusa class polynomials. And by the Chinese remainder approach, this further reduces to computing an Igusa class polynomial modulo a prime.

The curve generation technique described herein computes these polynomials modulo a prime by computing the roots of the above-described polynomials. A root is an integer r between 0 and p−1 with the following property: if one substitutes X=r in the above polynomial, then the result is zero. In other words, if the Igusa class polynomial equals $X^5 + aX^4 + bX^3 + dX^2 + eX + f$, then r is an integer that satisfies $r^5 + ar^4 + br^3 + dr^2 + er + f = 0$. It is well known that if one knows all of the roots r—there are 5 of them in the above example—then one can compute the coefficients a, b, c, d, e, f of the polynomial. Explicitly, if the roots are $r^1, r^2, r^3, r^4, r^5$, then one has $$X^5 + aX^4 + bX^3 + dX^2 + eX + f = (X - r_1)(X - r_2)(X - r_3)(X - r_4)(X - r_5).$$

The original idea of using Chinese remaindering tried to find all the roots by a 'random search'. This is quite slow: one has to try many values for r and see if they are a root. In the present technique, instead of searching for all of the roots, the technique only searches for one root. Once the one root is found, advanced mathematics (mathematical detail described in Appendix A, Section A.5 and A.6, and in particular Algorithms 5.2 and 6.2) are used to find the other roots. A key point is that the technique only performs one random search, instead of many.

The following paragraphs explain how the technique can find the other roots of an Igusa class polynomial given one root. More specifically, given a root r of an Igusa class polynomial modulo a prime, the technique computes the other roots. The technique employs isogenies in order to solve this problem. Every root r is associated to a genus 2 curve, and the roots—or the corresponding curves—are related by isogenies. An isogeny is a mathematical object, it is the natural map between two genus 2 curves. The technique uses these isogenies to 'move' from one root to the next root. The technique employs an extremely efficient, novel way to compute these isogenies. Experts in this field know that there is in principle a way of doing this, but this is approach is not computable. In other words, although there is a theoretical method to compute isogenies, this theoretical method does not work in practice. It would take many years to compute even one example. The technique described herein bypasses this obstruction. It first moves from the root r of an Igusa class polynomial to a root r' of a different polynomial. This root r' corresponds to a genus 2 curve with additional structure representing additional points on the genus 2 curve. For this curve with additional structure, the technique can compute an isogeny. This yields another genus 2 curve with additional structure, and it corresponds to a root s' of a polynomial. The technique then maps this root s' to a root s of the Igusa class polynomial. To find all the roots of the Igusa class polynomial, the technique applies this core algorithm many times: once for every root.

Figure 4:
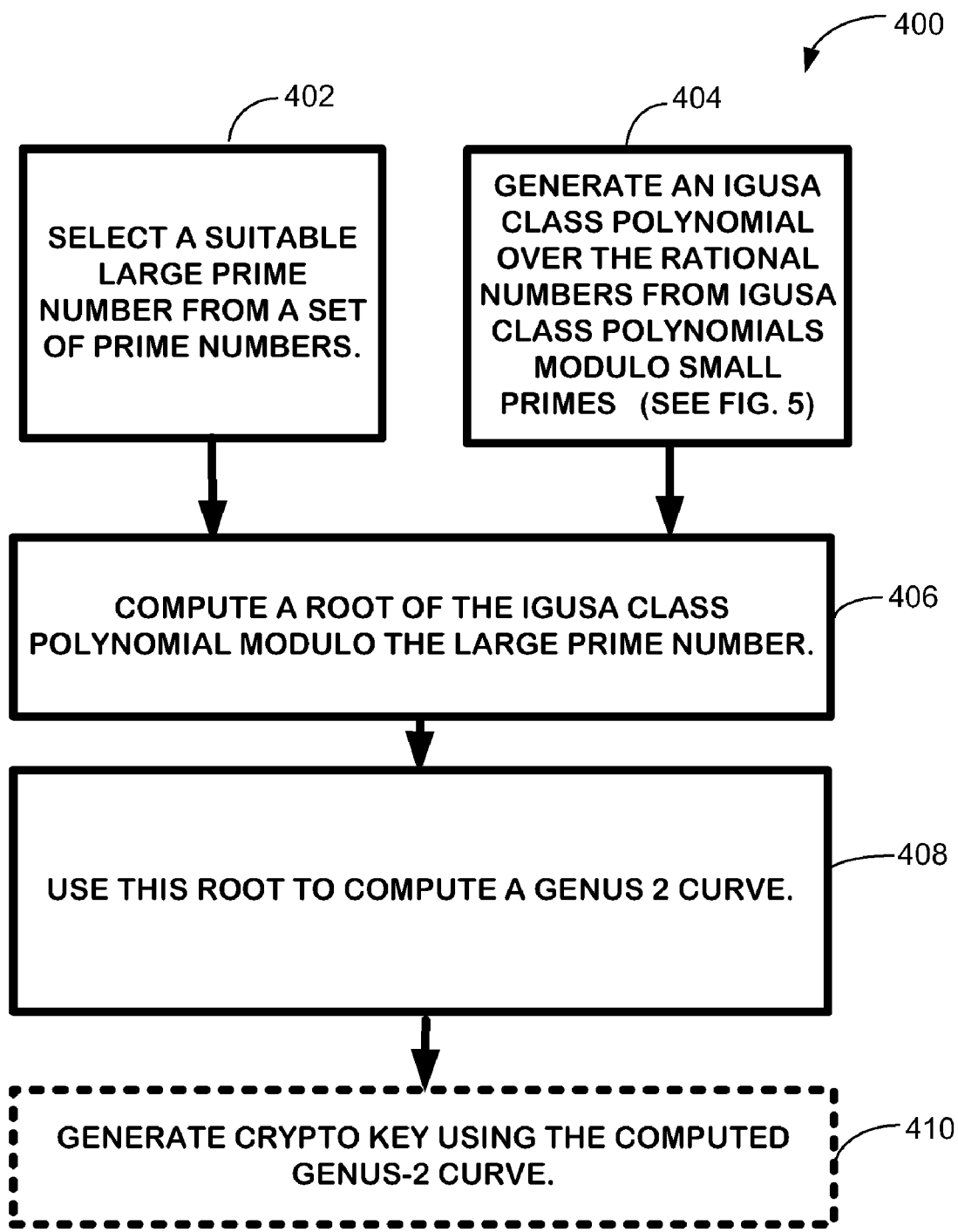
FIG. 4 is a flow diagram depicting an exemplary embodiment of a process employing one embodiment of the cryptographic curve generation technique.

1.3 Exemplary Processes Employed by the Cryptographic Curve Generation Technique An exemplary process 400 employing the cryptographic curve generation technique is shown in FIG. 4. As shown in FIG. 4, block 402, a suitable large prime number is selected from a predefined set of large prime numbers. An Igusa class polynomial over the rational numbers is generated from Igusa class polynomials modulo small primes, as shown in block 404. The process for computing this Igusa class polynomial from the Igusa class polynomials small primes is detailed in FIG. 5 and will be discussed in greater detail later. The large prime number selected from the predefined set of large prime numbers and the Igusa class polynomial are used to compute a root of the Igusa class polynomial modulo the selected large prime number, as shown in block 406. This computed root is then used to generate a genus 2 curve, as depicted in block 408. In one embodiment of the cryptographic curve generation technique the genus 2 curve is generated using Mestre's algorithm. Finally, the genus 2 curve can be used for various purposes, such as, for example, generating a crypto key, as shown in block 410.

Figure 5:
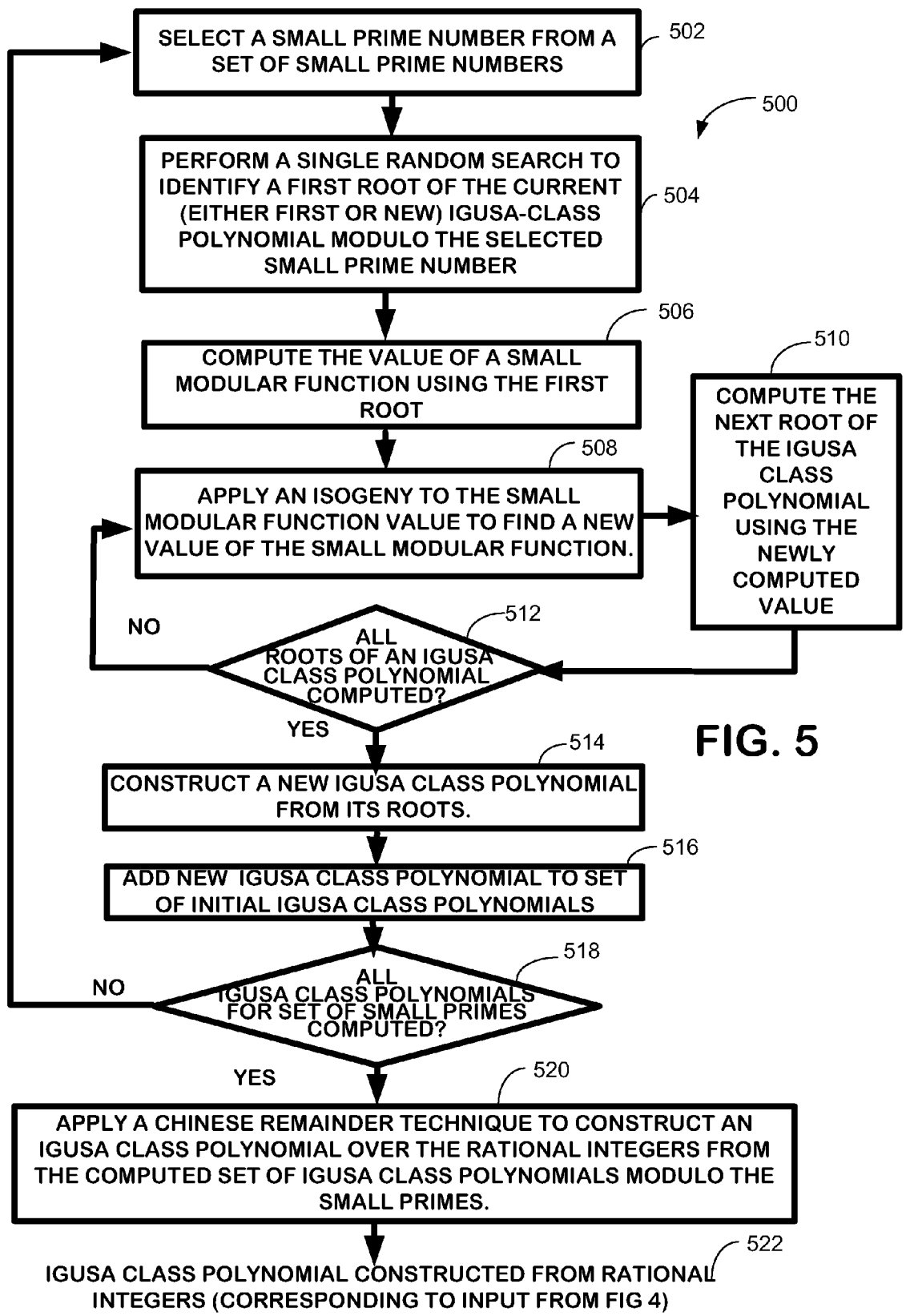
FIG. 5 is a flow diagram depicting an exemplary embodiment of a process employing the cryptographic curve generation technique wherein an Igusa class polynomial over rational numbers is computed from a set of Igusa class polynomials modulo small primes.

FIG. 5, provides another exemplary process 500 of one embodiment of the cryptographic curve generation technique. This process depicts how an Igusa class polynomial can be constructed over rational numbers from a computed set of Igusa class polynomials computed modulo a set of small primes. As shown in block 502 a small prime number is selected from a set of prime numbers. A single random search is performed to identify a first root of an Igusa class polynomial modulo the selected small prime number, as shown in block 504. A value of a small modular function is then computed using this root, as shown in block 506. (Mathematical details for computing this small modular function are described in Appendix A, Section A.4) In block 508, an isogeny is applied to the small modular function value, in one embodiment a Siegel modular function, to find a new value of the small modular function. This new value of the small modular function is used to find the next root of the Igusa class polynomial (block 510). A check (block 512) is made to determine if all of the roots of the Igusa calls polynomial are computed. If not, blocks 508, 510 and 512 are repeated until all roots are computed. Once all roots are computed, as shown in block 514, an Igusa class polynomial is constructed from the computed roots, and this new Igusa class polynomial is added to a set of Igusa class polynomials so computed (block 516). This is repeated for all of the small primes of the predefined field of small prime numbers (blocks 502, 504, 506, 508, 510, 512, 514, 516, 518). A Chinese remainder approach is then applied to construct an Igusa class polynomial over the rational numbers from the computed set of Igusa class polynomials modulo the small primes, as shown in block 520. This Igusa class polynomial over the rational numbers can then be used to create a genus 2 curve for cryptography or for other purposes (522).

Figure 6:
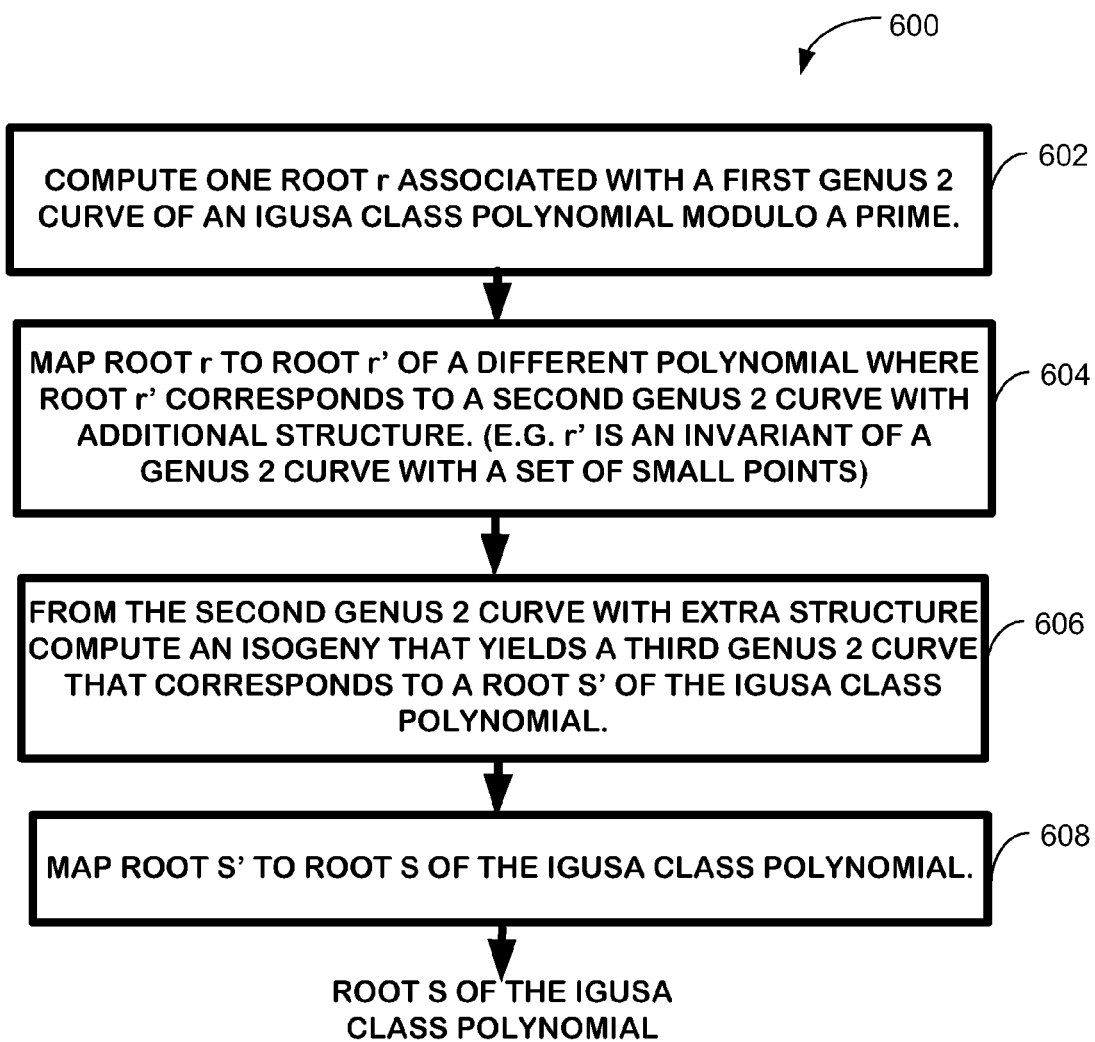
FIG. 6 is a flow diagram depicting an exemplary embodiment of a process employing one embodiment of the cryptographic curve generation technique where one root of an Igusa class polynomial is found and other roots are found by mapping isogenies using a small modular function.
Figure 7:
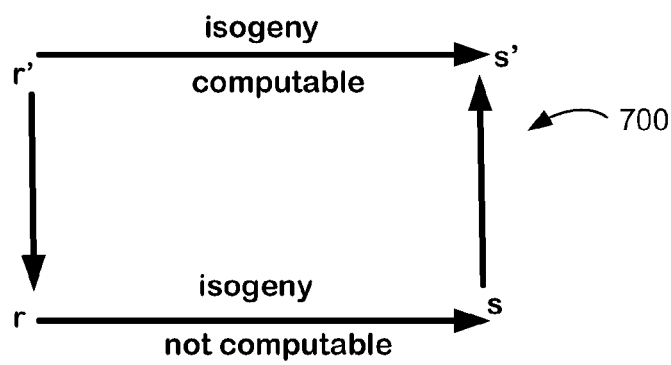
FIG. 7 is a diagram mapping one root of an Igusa class polynomial to another root in an exemplary embodiment of a process employing the cryptographic curve generation technique.

FIG. 6 depicts an exemplary process 600 employed by one exemplary embodiment of the cryptographic curve generation technique whereby the roots of the Igusa class polynomial modulo a prime are computed, given the first root. As shown in block 602, a first root r of an Igusa class polynomial modulo a prime, associated with a genus 2 curve, is computed. Typically this is done by performing a random search. Referring to block 604, once the first root r is found, this root is mapped to root r' of a different polynomial where root r' corresponds to a second genus 2 curve with additional structure (additional points on the curve). From the second genus 2 curve with additional structure, an isogeny that corresponds to a root s' of a polynomial is computed, as shown in block 606. Finally, the root s' is mapped to the root s of the Igusa class polynomial, yielding root s of the Igusa class polynomial, as shown in block 608. To find all the roots of the Igusa class polynomial, the technique applies this core algorithm many times: once for every root. FIG. 7 graphically depicts this process 700. Appendix A, Algorithm 6.2 gives an advanced mathematical description corresponding to this process.

Figure 8:
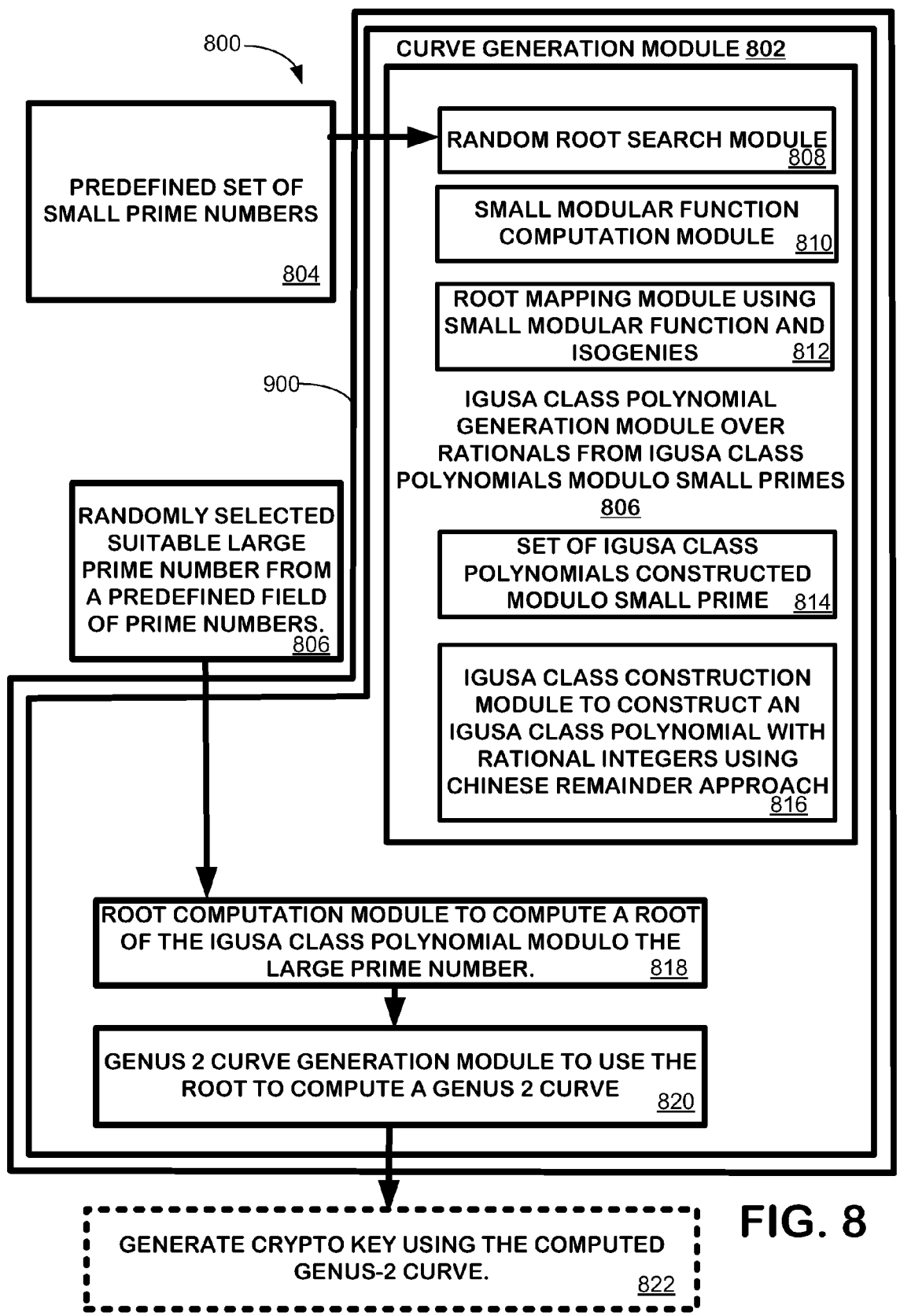
FIG. 8 is a diagram depicting one exemplary architecture in which one embodiment of the cryptographic curve generation technique can be practiced.

1.4 Exemplary Architecture Employing the Cryptographic Curve Generation Technique FIG. 8, provides one exemplary architecture 800 in which one embodiment of the cryptographic curve generation technique can be practiced. This architecture 800 includes a curve generation module 802, similar to curve generation module 152, previously described that resides on a computing device 900, such as will be described in more detail with respect to FIG. 9. As shown in block 804, a small prime number is selected from a predefined set of small prime numbers and this small prime number is input into an Igusa class polynomial generation module 806. A random root search module 808, performs a single random search to identify a first root of an Igusa class polynomial modulo the selected small prime number. A value of a small modular function is computed in a small modular function computation module 810, using the first root. (Mathematical details for computing this small modular function are described in Appendix A, Section A.4) In block 812, a root mapping module, an isogeny is applied to the small modular function to find a new value of the small modular function. This new value of the small modular function is used to find the next root of the Igusa class polynomial. A check is made to determine if all roots of the Igusa calls polynomial are computed. If not, root mapping continues until all roots are computed. Once all roots are computed, an Igusa class polynomial construction module 814 constructs the Igusa class polynomial from the computed roots. This is repeated for several small prime numbers and as a result a set of Igusa class polynomials are constructed modulo small prime (block 814). A Chinese remainder approach is then applied to find the Igusa class polynomial over the rational numbers, as depicted in block 816. Once the Igusa class polynomial is found over the rational numbers, it is input into a root computation module 818, along with a randomly selected large prime number selected from a predefined field of large prime numbers. The root computation module 818 finds a first root of the Igusa class polynomial over the rational numbers. This root is then used to find a genus 2 curve in a genus 2 generation module 820 (e.g., via Mestre's algorithm). This genus curve can then be used for cryptography or for other purposes, such as, for example, generating a crypto key 822, or counting points on the Jacobian of a curve.

3.0 The Computing Environment

The cryptographic curve generation technique is designed to operate in a computing environment. The following description is intended to provide a brief, general description of a suitable computing environment in which the cryptographic curve generation technique can be implemented. The technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 9:
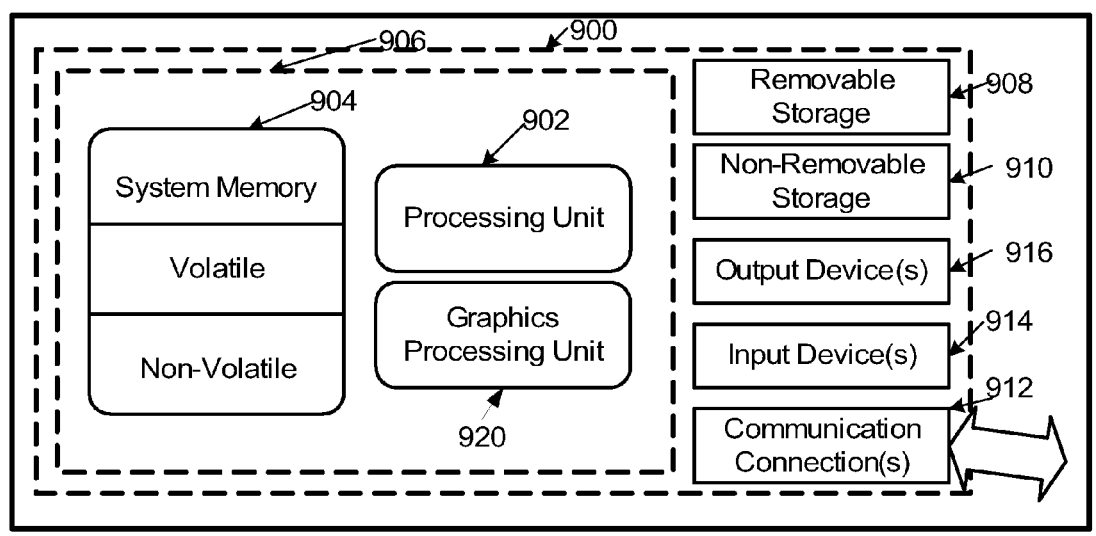
FIG. 9 is a schematic of an exemplary computing device in which the cryptographic curve generation technique can be practiced.

FIG. 9 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 9, an exemplary system for implementing the cryptographic curve generation technique includes a computing device, such as computing device 900. In its most basic configuration, computing device 900 typically includes at least one processing unit 902 and memory 904. Depending on the exact configuration and type of computing device, memory 904 may be volatile (such as RAM), non-volatile (such as ROM, flash memory, etc.) or some combination of the two. This most basic configuration is illustrated in FIG. 9 by dashed line 906. Additionally, device 900 may also have additional features/functionality. For example, device 900 may also include additional storage (removable and/or non-removable) including, but not limited to, magnetic or optical disks or tape. Such additional storage is illustrated in FIG. 9 by removable storage 908 and non-removable storage 910. Computer storage media includes volatile and nonvolatile, removable and non-removable media implemented in any method or technology for storage of information such as computer readable instructions, data structures, program modules or other data. Memory 904, removable storage 908 and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 900. Any such computer storage media may be part of device 900.

Device 900 may also contain communications connection(s) 912 that allow the device to communicate with other devices. Communications connection(s) 912 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 900 may have various input device(s) 914 such as a display, a keyboard, mouse, pen, camera, touch input device, and so on. Output device(s) 916 such as speakers, a printer, and so on may also be included. All of these devices are well known in the art and need not be discussed at length here.

The cryptographic curve generation technique may be described in the general context of computer-executable instructions, such as program modules, being executed by a computing device. Generally, program modules include routines, programs, objects, components, data structures, and so on, that perform particular tasks or implement particular abstract data types. The cryptographic curve generation technique may be practiced in distributed computing environments where tasks are performed by remote processing devices that are linked through a communications network. In a distributed computing environment, program modules may be located in both local and remote computer storage media including memory storage devices.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

APPENDIX A

A.1 Mathematical Details

In this section advanced mathematical details for implementing various embodiments of the cryptographic curve generation technique described herein are provided. Various mathematical theorems, proofs and algorithms are provided that can be used to implement various embodiments of the cryptographic curve generating technique. Class field theory is used in the following description.

For an abelian variety A with endomorphism ring isomorphic to the maximal order $O_K$ in a quartic complex multiplication (CM)-field K, the Igusa invariants $j_1(A)$, $j_2(A)$, $j_3(A)$ generate an abelian extension of the reflex field $\tilde{K}$. In this description an explicit description of the Galois action of the class group of $\tilde{K}$ on these Igusa values is provided. The description given is geometric and it can be expressed by maps between various Siegel modular varieties. The technique can explicitly compute this action for ideals of small norm, and this allows one to compute various Igusa class polynomials modulo primes.

A.2 Introduction

Class field theory describes the abelian extensions of a given number field K. If K equals the rational numbers Q, then the Kronecker-Weber theorem tells us that every abelian extension of K is contained in a cyclotomic extension. In 1900, Hilbert asked for a similar 'explicit description' for higher degree number fields. This not-entirely well-posed problem, known as Hilbert's $12^{th}$ problem, is still largely unsolved.

Besides K=Q, the answer is only completely known for imaginary quadratic fields K. In this case, the solution is provided by complex multiplication theory. The techniques used can be generalized to CM-fields K, i.e., imaginary quadratic extensions of totally real fields. However, for general CM-fields one does not always get an explicit description of the full maximal abelian extension. From a computational perspective, the case of general CM-fields is far less developed than the imaginary quadratic case.

In this description, a degree 4 CM-fields K is focused on. For such fields, invariants of principally polarized abelian surfaces (p.p.a.s.) with endomorphism ring isomorphic to the maximal order $O_K$ of K generate a subfield of the Hilbert class field of the reflex field $K_r$ of K. The reflex field $K_r$ of K is a degree 4 subfield of the normal closure of K and equals K in case K is Galois. To explicitly compute the resulting extension, one can compute an Igusa class polynomial $$P_K = \prod_{\{A p.p.a.s.|End(A)=O_K\}/\cong} (X - j_1(A)) \in Q[X],$$

if A is not isomorphic to a product of elliptic curves. Here, $j_1$ is one of the three Igusa invariants of A. A contrast with the case of imaginary quadratic fields—where one computes the Hilbert class polynomial—is that the polynomial $P_K$, need not be irreducible over Q, and it will typically not have integer coefficients.

There are various methods to explicitly compute the polynomial $P_K$. One can use complex arithmetic, p-adic arithmetic for p=2, 3 or finite field arithmetic. However, none of these approaches exploit the Galois action of $Gal(K_r(j_1(A))/K_r)$ on a p.p.a.s. A that has endomorphism ring $O_K$. The goal is to make this Galois action explicit and give a method to compute it. The cryptographic curve generation technique described herein to compute the Galois action significantly speeds up the 'CRT-approach' to computing an Igusa class polynomial and to a lesser extent it improves the 3-adic approach.

Besides speeding up the computation of Igusa class polynomials, the technique described herein gives a method of computing isogenies between abelian surfaces over finite fields. Computing an isogeny is a basic computational problem in arithmetic geometry, and the technique described herein can be used in a variety of contexts, ranging from point counting on Jacobians of curves to cryptographic protocols.

A.3 Computing a CM-Action

Throughout this section, let K be a fixed primitive quartic CM-field. One lets C denote the field of complex numbers. One also fixes a CM-type $\Phi: K \to C^2$, and views the maximal order $O_K$ of K embedded into $C^2$ via this CM-type. Let A/C be a principally polarized abelian surface that has complex multiplication by $O_K$. The condition that K is primitive ensures that A is simple, i.e., not isogenous to a product of elliptic curves. The field $K_\Phi(j_1(A), j_2(A), j_3(A))$ that one gets by adjoining the Igusa invariants of A to the reflex field $K_\Phi$ is a subfield of the Hilbert class field $H(K_\Phi)$ of $K_\Phi$.

The Artin map induces an isomorphism $$Gal(H(K_\Phi)/K_\Phi) \to Cl(O_{K_\Phi})$$

between the Galois group of the extension $H(K_\Phi)/K_\Phi$ and the class group Cl of the maximal order of $K_\Phi$. The resulting action of $Cl(O_{K_\Phi})$ on the set of all principally polarized abelian surfaces that have CM by $O_K$ is given by the typenorm map $$N_\Phi: Cl(O_{K_\Phi}) \to \mathbf{C}(K).$$

This section explains how one can explicitly compute this action.

Let I be a $O_{K_\Phi}$-ideal of norm l. One assumes for simplicity that l is prime. One has $N_\Phi(I)=(J,l) \in \mathbf{C}(K)$, where J is an $O_K$-ideal of norm $l^2$.

Lemma 3.1. Let I be an $O_{K_\Phi}$-ideal of prime norm l with typenorm $N_\Phi(I)=(J,l)$. Then the $O_K$-ideal J ideal divides $(l) \subset O_K$.

Proof. This is clear if K/Q is Galois. Indeed, in this case I and all its Galois conjugates divide (l) as $O_K$-ideal.

If the normal closure L/K has Galois group $D_4$, then the ideal J is given by $$J=N_{L/K}(IO_L).$$

Since the splitting of l in $K_\Phi$ determines the splitting of l in K, a case-by-case check gives the lemma.

For an $O_K$-ideal M, the 'M-torsion' of the abelian surface A is defined by $$A[M]=\{P \in A(C) | \forall \alpha \in M: \alpha(P)=0\}, \quad (4.1)$$

where one notes that equation (4.1) depends on the choice of the CM-type. If M is generated by an integer n, then A[M] equals the n-torsion A[n].

Lemma 4.1 provides that group A[J] is a 2-dimensional subspace of the l-torsion A[l] of A. The polarization of A induces a symplectic form on A[l], and A[l] is a symplectic vector space of dimension 4 over the finite field $F_l$. By CM-theory one knows that the quotient $$A/A[J]$$

is again a principally polarized abelian surface. This implies that A[J] is an isotropic subspace of A[l], i.e., the symplectic form vanishes on A[J]. This means that the map $$A \to A/A[J]$$

is an (l,l)-isogeny.

The moduli space of all pairs (S,G), with S a principally polarized abelian surface over C and G a 2-dimensional isotropic subspace of S[l] can be described by an ideal $V(l) \subset Q[X_1, Y_1, X_2, Y_2, Z_2]$. More precisely, the variety corresponding to V(l) equals the Siegel modular variety $Y_0^{(2)}(l)$. As a complex Riemann surface, one has $$Y_0^{(2)}(l) = \Gamma_0^{(2)}(l) \backslash H_2,$$

with $$\Gamma_0^{(2)}(l) = \left\{ \begin{pmatrix} ab \\ cd \end{pmatrix} \in Sp(4, Z) \middle| c \equiv 0_2 \bmod l \right\}.$$

If one specializes V(l) in a point $(X_1, Y_1, Z_1)=(j_1(A), j_2(A), j_3(A))$, then the resulting ideal V'(l) is 0-dimensional. The corresponding variety is a union of points corresponding to the '(l,l)-isogenous surfaces'. As there are $[H_2:\Gamma_0^{(2)}(l)]=(l^4-1)/(l-1)$ isotropic subspaces of dimension 2 in A[l], there are exactly $(l^4-1)/(l-1)$ solutions to the system of equations given by V'. By construction, the triple $$(j_1(A/J), j_2(A/J), j_3(A/J))$$

is one of the solutions. There are $l^3+l^2+1$ other solutions, and it will be seen later that for CM-computations it is relatively easy to determine which of the solutions comes from the typenorm of an $O_{K_\Phi}$-ideal.

Unfortunately, the ideal V(l) can only be computed for very small l. Indeed, the only case that has been done is l=2 and it takes roughly 50 Megabytes to store the 3 generators of V. Knowing the ideal V for some prime l implies that one has an equation for the Humbert surface of degree $l^2$. As computing Humbert surfaces is a traditionally hard problem, one does not expect that much progress can be made in computing V for primes l>2.

A.4 Smaller Modular Functions

The Igusa functions introduced in Section A.2 are 'too large' to be practical in our computation of the CM-action: we cannot compute an ideal describing the variety $Y_0^2(l)$ for primes l>2. In this section smaller functions $f_1, \ldots, f_4$ employed by the present curve generation technique are introduced that are more convenient from a computational perspective.

For $x, y \in \{0,1\}^2$, define the functions $\theta_{x,y}: H_2 \to C$ by $$\theta_{x,y}(\tau) = \sum_{n \in Z^2} \exp \pi i \left( \left(n + \frac{x}{2}\right)^T \tau \left(n + \frac{x}{2}\right) + \left(n + \frac{x}{2}\right)^T y \right). \quad (1)$$

The functions $\theta_x$ are known as the 'theta nullvalues' and arise naturally from the construction of theta functions. The easily proved equality $\theta_{x,y}(\tau) = (-1)^{x^T y} \theta_{x,y}(\tau)$ shows that of the 16 theta null values only 10 of them are non-zero.

The fourth powers of the functions $\theta_{x,y}$ are Siegel modular forms of weight 2 for the congruence subgroup $\Gamma(2) \subset Sp(4, Z)$. The Satake compactification $X(2)$ of the quotient $\Gamma(2) \backslash H_2$ has a natural structure of a projective variety, and the fourth powers $\theta_{x,y}^4$ define an embedding of $X(2)$ into projective space.

Theorem 4.1. Let $M_2(\Gamma(2))$ denote the C-vector space of all Siegel modular forms of weight 2 for the group $\Gamma(2)$. Then the following holds: the space $M_2(\Gamma(2))$ is 5-dimensional and is spanned by the 10 modular forms $\theta_{x,y}^4$. Furthermore, the map $X(2) \to P^9$ defined by the functions $\theta_{x,y}^4$ is an embedding. The image is the quartic threefold in $P^4$ defined by $$u_2^2 - 4u_4 = 0$$

with $$u_k = \sum_{x,y} \theta_{x,y}^{4k}.$$

Proof The fact that the space if 5-dimensional is classical. All one has to do is check that the linear span of the 10 modular forms that gives a 5-dimensional space, which is an easy calculation.

It is well known that an equality $C(j_1, j_2, j_3) \subseteq C(\theta_{x,y}^4/\theta_{x',y'}^4)$ exists where one uses the convention that all quotients of theta fourth powers are considered. Indeed, the formulas that many people use to evaluate Igusa functions readily express $j_1, j_2, j_3$ in terms of $\theta_{x,y}^4$. The functions $\theta_{x,y}^4/\theta_{x',y'}^4$ are rational Siegel modular functions of level 2. Whereas a value $(j_1(\tau), j_2(\tau), j_3(\tau))$ depends only on the $Sp(4,Z)$-equivalence class of $\tau \in H_2$ under the symplectic group $Sp(4,Z)$ a value $(\theta_{x,y}^4/\theta_{x',y'}^4)_{x,x',y,y'}$ depends on the $\Gamma(2)$-equivalence class of a 2 by 2 matrix $\tau$. Since the affine points of $\Gamma(2) \backslash H_2 \subset X(2)$ correspond to isomorphism classes of triples $(A, \langle P, Q \rangle)$ consisting of a principally polarized 2-dimensional abelian variety A together with a basis P, Q of the 2-torsion, the functions $\theta_{x,y}^4/\theta_{x',y'}^4$ not only depend on the abelian variety in question but also on an ordering of its 2-torsion. For every isomorphism class $Sp(4, Z)\tau$ of abelian varieties, there are $[Sp_4(Z): \Gamma(2)] = 720$ values for the tuple $(\theta_{x,y}^4(\tau)/\theta_{x',y'}^4(\tau))_{x,x',y,y'}$. The functions $\theta_{x,y}^4/\theta_{x',y'}^4$ are 'smaller' than the Igusa functions in the sense that their Fourier coefficients are smaller. A natural idea is to get even smaller functions by considering the quotients $\theta_{x,y}/\theta_{x',y'}$ themselves instead of their $4^{th}$ powers. One defines the four functions $f_1, f_2, f_3, f_4: H_2 \to C$ by $$f_1 = \theta_{(0,0),(0,0)} \quad f_2 = \theta_{(0,0),(\frac{1}{2},\frac{1}{2})} \quad f_3 = \theta_{(0,0),(\frac{1}{2},0)} \quad f_4 = \theta_{(0,0),(0,\frac{1}{2})}.$$

One stresses that the particular choice of the 'theta constants' is rather arbitrary, the only requirement is that one defines 4 different functions. The three quotients $f_1/f_4, f_2/f_4, f_3/f_4$ are rational Siegel modular functions.

Theorem 4.2. One has an inclusion $C(j_1, j_2, j_3) \subseteq C(f_1, f_2, f_3, f_4)$. Furthermore, the quotients $f_1/f_4, f_2/f_4, f_3/f_4$ are invariant under the subgroup $\Gamma(8)$.

Proof. Five linear relations between the $\theta_{x,y}^4$, can be found explicitly using Riemann's theta. The vector space $M(\Gamma(2))$ can be spanned by $\{f_1^4, \ldots f_4^4, g^4\}$ where $g = \theta_{(0,1/2),(0,0)}$. The degree 4 relation in Theorem 1, together with the five linear relations yield that $g^4$ satisfies a degree 4 polynomial P over $L = C(f_1, f_2, f_3, f_4)$. The polynomial P factors over L as a product of the 2 irreducible quadratic polynomials $$P_-, P_+ = T^2 - (f_1^4 - f_2^4 + f_3^4 - f_4^4)T + (f_1^2 f_3^2 \pm f_2^2 f_4^2)^2.$$

By looking at the Fourier expansions of $f_1, \ldots, f_4$ and g, ones see that g only satisfies the polynomial $P_-$. Hence, the extension $L(g^4)/L$ is quadratic and generated by a root of $P_-$.

For each of the two choices of a root of $P_-$, the other 5 fourth powers of theta functions will be uniquely determined. Indeed, the fourth powers are functions on the space $M(\Gamma(2))$ and this space is 5-dimensional by Theorem 4.1. This means that one obtains a priori get two Igusa triples $(j_1, j_2, j_3)$ for every tuple $(f_1, f_2, f_3, f_4)$. However, a close inspection of the formulas expressing the Igusa functions in terms of theta fourth powers yields that these Igusa triples coincide. Hence, the triple $(j_1, j_2, j_3)$ does not depend on a choice of $P_-$. This proves the first statement in the theorem.

The second statement follows immediately from a result on Igusa. It has been proven that the field M generated by all theta quotients is left invariant by a subgroup of $\Gamma(8)$. As the field $C(f_1/f_4, f_2/f_4, f_3/f_4)$ is a subfield of M, Theorem 4.2 follows.

As the functions $f_1/f_4, f_2/f_4, f_3/f_4$ are invariant under $\Gamma(8)$, the moduli interpretation is that they depend on an abelian variety together with a level 8-structure. One lets $Stab(f)$ be the stabilizer of $f_1/f_4, f_2/f_4, f_3/f_4$ inside the symplectic group $Sp(4,Z)$. The quotient space $$Y(f) = Stab(f) \backslash H_2$$

then has a natural structure of a quasi-projective variety by the Baily-Borel theorem. One denotes its Satake compactification by $X(f)$.

Lemma 4.3. The map $X(f) \to X(1)$ induced by the inclusion $Stab(f) \to Sp(4,Z)$ has degree 46090.

Proof. One knows that $Stab(f)$ has index $4^3 = 64$ in $\Gamma(2)$. The group $\Gamma(2)$ in turn has index 720 in $Sp(4,Z)$ and the lemma follows.

The proof of Theorem 4.2 readily gives a means of computing an Igusa triple $(l_1(\tau), j_2(\tau), j_3(\tau))$ from a tuple $(f_1(\tau), \ldots, f_4(\tau))$. Conversely, it is 'classical' to compute an element $(f_1(\tau), \ldots, f_4(\tau))$ given a (finite) Igusa triple. The computation follows the formulas for theta functions from the $19^{th}$ century. One first computes the corresponding 'Igusa Clebsch invariants' $I_2, I_4, I_6, I_{10}$. After applying the transformation $$s_1 = 3I_4$$

$$s_2 = 3/2(I_2 I_4 - 3I_6)$$

$$s_3 = 5/12 s_1 s_2 + 3^5 \cdot 5 I_{10}$$

$$s_4 = 27/16 I_4^3 + 1/6 s_2^2 + 3^6/2^2 I_2 I_{10},$$

one computes the roots $x_1, \ldots, x_6$ of the sextic polynomial $$X^6 - \frac{1}{2}s_1 X^4 - \frac{1}{3}s_2 X^3 + \frac{1}{16}s_1^2 X^2 +$$
$$\left(\frac{1}{6}s_1 s_2 - \frac{1}{5}s_3\right)X + \left(\frac{1}{96}s_1^3 + \frac{1}{18}s_2^2 - \frac{1}{6}s_4\right)$$

with coefficients in $Q(s_1,s_2,s_3,s_4)$. One choice for $f_1^4, f_2^4, f_3^4, f_4^4$ is given by $$f_1^4 = (-x_1-x_2-x_4)/3$$

$$f_2^4 = (-x_1-x_3-x^4)/3$$

$$f_3^4 = (-x_1-x_2-x_3)/3$$

$$f_4^4 = (-x_2-x_3-x_4)/3$$

Finally, one extracts fourth roots to find values for $(f_1(\tau), \ldots, f_4(\tau))$. There are $720 \cdot 64 = 46080$ possible values for this tuple.

A.5 The CM-Action and Level Structure

One lets Stab($f$) be the stabilizer of the three quotients $f_1/f_4, f_2/f_4, f_4/f_4$ defined in Section A.3. By Theorem 4.2, one has $\Gamma(8) \subseteq \text{Stab}(f)$. For a prime $l>2$, one now defines $$Y(f;l) = (\text{Stab}(f) \cap \Gamma_0^{(2)}(l)) \backslash H_2$$

which one views as an equality of Riemann surfaces. By the Baily-Borel theorem, the space $Y(f;l)$ has a natural structure of a quasi-projective variety. One denote its Satake compactification by $X(f;l)$.

The moduli interpretation of the variety $Y(f;l)$ is the following. Points are isomorphism classes of triples $(S,G,L)$, where $S$ is a principally polarized abelian surface over the complex numbers, $G$ is a 2-dimensional isotropic subspace of $S[l]$ and $L$ is a level 8-structure. The notion of isomorphism is that $(S,G,L)$ and $(S',G',L')$ are isomorphic if and only if there is an isomorphism of principally polarized abelian surfaces $\phi$: $S \to S'$ that satisfies $\phi(G)=G'$ and $\phi(L)=L'$.

Lemma 1. The map $X(f;l) \to X(f)$ induced by the inclusion map $(\text{Stab}(f) \cap \Gamma_0^{(2)}(l)) \to \text{Stab}(f)$ has degree $(l^4-1)/(l-1)$ for primes $l>2$.

Proof. This is clear: the choice of a level 8-structure L is independent of the choice of a subspace of the l-torsion for $l>2$.

Besides the map $X(f;l) \to X(f)$ from the lemma, one also has a map $X(f;l) \to X(f)$ given by $$(S,G,L) \mapsto (S/G, L')$$

on the open subvariety $Y(f; l)$. Indeed, the isogeny $\phi: S \to S/G$ induces an isomorphism $$S[8] \to (S/G)[8]$$

and one has $L'=\phi(L)$. It it not hard to see that this map also has degree $(l^4-1)/(l-1)$. One can so find all the abelian surfaces that are (1,1)-isogenous to a given surface A. Indeed, one first maps the Igusa invariants $(j_1(A), j_2(A), j_3(A))$ to a point in $X(1)$, say given by the Igusa-Clebsch invariants. One then chooses (A,L) on $Y(f)$ lying over this point. Although there are 46080 choices for L, it does not matter which one is chosen. Above (A,L), there are $(l^4-1)/(l-1)$ points in $Y(f;l)$ and via the map $t: Y(f;l) \to Y(f)$ one maps all of those down to $Y(f)$. Forgetting the level 8-structure now yields $(l^4-1)/(l-1)$ points in $X(1)$. If A is simple, then one can transform those into absolute Igusa invariants.

Assuming one can compute an ideal $V(f;l) \subset Q[W_1, X_1, Y_1, Z_1, W_2, X_2, Y_2, Z_2]$ defining the projective variety $X(f;l)$, one derives the following algorithm to compute all (1,1)-isogenous abelian surfaces.

Algorithm 5.2.

Input. A simple principally polarized abelian surface A/C given by its Igusa invariants, and the ideal $V(f;l)$ defining $X(f;l)$.

Output. The Igusa invariants of all principally polarized abelian surfaces that are (1,1)-isogenous to A.

1. Compute Igusa-Clebsch invariants $(I_2, I_4, I_6, I_{10}) \in C^5$ corresponding to A.
2. Choose an element $(f_1, f_2, f_3, f_4) \in Y(f)$ that maps to $(I_2, I_4, I_6, I_{10})$ using the method described at the end of Section A.4.
3. Specialize the ideal $V(f;l)$ in $(W_1, X_1, Y_1, Z_4) = (f_1, f_2, f_3, f_4)$ and solve the remaining system of equations.
4. For each solution found in the previous step, compute the corresponding point in $X(1)$ using the method given in the proof of Theorem 4.2.

A.5.1 Computing $V(f;l)$

In this subsection, an algorithm to compute the ideal $V(f;l)$ needed in Algorithm 5.2 is provided. The approach only terminates in a reasonable amount of time in the simplest case $l=3$.

The Fourier expansion from Section A.4 can be written in terms of the individual matrix entries, and with some minor modifications one can represent it as a power series with integer coefficients. Write $$\tau = \begin{pmatrix} \tau_1 & \tau_2 \\ \tau_2 & \tau_3 \end{pmatrix} \in H_2,$$

then $$\theta_{(a,b),(c,d)}(\tau) = \sum_{(x_1,x_2) \in Z^2} (-1)^{x_1 c + x_2 d} p^{(2x_1+a)^2} q^{(2x_1+a+2x_2+b)^2} r^{(2x_2+b)^2} \in Z[[p,q,r]]$$

where $p = e^{2\pi i (\tau_1 - \tau_2)/8}, q = e^{2\pi i \tau_2/8}$ and $r = e^{2\pi i (\tau_3 - \tau_2)/8}$. One sees that it is easy to compute Fourier expansions for the Siegel modular forms $f_i$.

One of the (1,1)-isogenous surfaces to $C^2/(Z^2 + Z^2 \cdot \tau)$ is the surface $C^2/(Z^2 + Z^2 \cdot l\tau)$, and one wants to find a relation between the $f_i$'s and the functions $f_i(l\tau)$. The expansion for $f_i(l\tau)$ can be constructed easily from the Fourier expansion of $f_i(\tau)$ by replacing p, q, r with $p^l, q^l, r^l$.

For increasing positive integers $d=2, 3, \ldots$, one does the following. One computes all homogeneous monomials of degree d in $\{f_i(\tau), f_i(l\tau)\}$ represented as truncated power series and then uses exact linear algebra to find linear dependencies between them. The basis of relations will 'stabilize' as the power series precision increases. There are two ways to check experimentally whether one has enough relations: $V(f;l)$ has the correct dimension and the projection maps have the correct degrees. Starting with $d=2$, one searches for homogeneous relations relations of degree d, then $d+1$ and so on, increasing the degree until one has enough relations.

Using this method one computes the ideal $V(f;3)$. The (3,3)-isogeny relations in $V(f;3)$ are given by 85 homogeneous polynomials of degree six. The whole ideal takes 35 kilobytes to store. The individual relations are fairly small, having at most 40 terms. Furthermore, the coefficients are 8-smooth and bounded by 200 in absolute value, which makes them amenable for computations. It should be stressed, however, that one cannot rigorously prove that the ideal V(f;3) found is correct. One only has 'empirical evidence' that it is correct.

A. 6. The CM-Action Over Finite Fields

The technique developed above uses the complex analytic definition of abelian surfaces and the Riemann surfaces $Y_0^{(2)}(1)$ and $Y(f;1)$. It will now be explained why one can use the results in positive characteristic as well. First, if one takes a prime p that splits completely in K, then by [5] the reduction modulo p of an abelian surface $A/H(K_\Phi)$ with endomorphism ring $O_K$ is ordinary. The reduced surface again has endomorphism ring $O_K$.

Furthermore, one can naturally associate an algebraic stack A to $Y_0^{(2)}(1)$ and one then proves that the structural morphism A→Spec(Z) is smooth outside 1. In a more down-to-earth computational terminology, this means the moduli interpretation of the ideal $V \subset Q[X_1, \ldots, Z_2]$ remains valid when one reduces the elements of V modulo a prime p≠1.

The reduction of Y(f;1) is slightly more complicated. The Siegel modular variety Y(8l) covers Y(f;1), and one can prove that Y(8l) has good reduction outside 2l. Being a quotient of Y(8l), the algebraic stack corresponding to Y(f;1) has the property that its structural morphism to Spec(Z) is smooth outside 2l. Again, this means that the moduli interpretation for the ideal $V(f;l) \subset Q[W_1, \ldots, Z_2]$ remains valid when one reduces the elements of V(f;1) modulo a prime p≠2l.

Lemma 6.1. Let l be prime, and let p≠2l be a prime that splits completely in a primitive CM-field K. Then, on input of the Igusa invariants of a principally polarized abelian surface $A/F_p$ with $End(A)=O_K$ and the ideal $V(f;l) \subset \overline{F}_p[W_1, \ldots, Z_2]$, Algorithm 5.2 computes the Igusa invariants of all (l,l)-isogenous surfaces.

Proof. Fix a primitive quartic CM-field K, and let p≠2l be a prime that splits completely in the Hilbert class field of the reflex field $K_\Phi$. In particular, p splits in $K_\Phi$ and as it splits in its normal closure L it will split completely in K as well. Hence, Lemma 1 applies. Because p splits completely in $H(K_\Phi)$, the Igusa invariants of an abelian surface $A/F_p$ with $End(A)=O_K$ are defined over the prime field $F_p$.

If one applies Algorithm 5.2 to $(j_1(A), j_2(A), j_3(A))$ and the ideal V(f;l), then we get $(l^4-1)(l-1)$ triples of Igusa invariants. All these triples are Igusa invariants of principally polarized abelian surfaces that have endomorphism algebra K. Some of these triples are defined over the prime field $F_p$ and some are not. However, since p splits completely in the Hilbert class field of $K_\Phi$, the Igusa invariants of the surfaces that have endomorphism ring $O_K$ are defined over the field $F_p$.

Algorithm 6.2

Input. The Igusa invariants of a simple principally polarized abelian surface $A/F_p$ with $End(A)=O_K$, and the ideal $V(f;l) \subset F_p[W_1, \ldots, Z_2]$. Here, l is a prime such that there exists a prime ideal in $K_\Phi$ of norm l. Furthermore, it is assumed that p≠2l.

Output. The Igusa invariants of all principally polarized abelian surfaces $A'/F_p$ with $End(A')=O_K$ that are (l,l)-isogenous to A.

1. Apply Algorithm 5.2 to A and V(f;l). Let S be the set of all Igusa invariants that are defined over $F_p$.
2. For each $(j_1(A'), j_2(A'), j_3(A')) \in S$, construct a genus 2 curve C having these invariants using Mestre's algorithm.
3. Apply the Freeman-Lauter algorithm to test whether Jac(C) has endomorphism ring $O_K$. Return the Igusa invariants of all the curves that pass this test.

One can predict beforehand how many triples will be returned by Algorithm 6.2. One computes the prime factorization $(l)=p_1^{e_1} \ldots p_k^{e_k}$ of (l) in $K_\Phi$. Say that one has n≦4 prime ideals $p_1, \ldots, p_n$ of norm l in this factorization, disregarding multiplicity. For each of these ideals $p_i$ one computes the typenorm map $N_\Phi(p_i) \in C(K)$. The size of $\{N_\Phi(p_1), \ldots, N_\Phi(p_n)\} \subset C(K)$. equals the number of triples computed by Algorithm 6.2.

A.6.1 Igusa Class Polynomials Modulo p

The 'CRT-algorithm' to compute the Igusa class polynomials $P_K, Q_K, R_K \in Q[X]$ of a primitive quartic CM-field K computes the reductions of these 3 polynomials modulo various primes p. For a given prime p that splits completely in the Hilbert class field of $K_\Phi$, one method suggested is to loop over all $p^3$ possible Igusa invariants. For each of the invariants $(j_1(A'), j_2(A'), j_3(A'))$, one has to run an 'endomorphism ring test' to see if A' has endomorphism ring $O_K$.

Algorithm 6.2 can be used to dramatically improve this algorithm of computing Igusa class polynomials modulo p. One computes the class group $$Cl(O_{K_\Phi}) = \langle p_1, \ldots, p_k \rangle \qquad (6.1)$$

of the reflex field. Here, one takes the generators $p_i$ to be of odd prime norm. For each of the norms $N_{K_\Phi/Q}(p_i)=l_i$, one computes the ideal $V(f;l_i)$ describing the Siegel modular variety $X(f;l_i)$.

Next, one tries random triples of Igusa invariants over $F_p$ until one finds a triple $(j_1(A), j_2(A), j_3(A))$ corresponding to a surface A with $End(A)=O_K$. One now applies Algorithm 6.2 to this surface A for all primes $l_i$. To all new surfaces, one again applies Algorithm 6.2 for all primes $l_i$. One continues this until one finds no new surfaces.

There is a possibility that one has not yet found all surfaces with endomorphism ring $O_K$. The problem is that that map $$N_\Phi : Cl(O_{K_\Phi}) \to \mathbb{C}(K)$$

is not always surjective. The solution is simple: one computes the cardinality of $\mathbb{C}(K)$ using [ref] and if the number of surfaces one found is less than $|\mathbb{C}(K)|$ one does a new random search and one applies Algorithm 6.2 as before. Once one has found all surfaces with endomorphism ring $O_K$, one simply expands $$P_K = \prod_{\{Ap.p.a.s. | End(A)=O_K\}/\cong} (X - j_1(A)) \in F_p[X]$$

and likewise for $R_K$ and $Q_K$. The main difference with the method from [ref] is that one only does $$\frac{|\mathbb{C}(K)|}{|N_\Phi(Cl(O_{K_\Phi}))|}$$

random searches, instead of $p^3$.

Wherefore, what is claimed is:

1. A computer-implemented process for generating a curve for use in cryptography, comprising:
   using a computer to perform the steps of:
   selecting a suitable large prime number from a predefined set of large prime numbers;
   generating an Igusa class polynomial over the rational numbers from Igusa class polynomials modulo small primes, comprising for a predefined set of small prime numbers,
   (a) selecting a small prime number from a predefined set of small prime numbers;

(b) performing a single random search to identify a first root of an Igusa class polynomial modulo the selected small prime number;
(c) computing a value of a small modular function using the first root;
(d) applying an isogeny to the small modular function value to find a new value of the small modular function;
(e) using the new value of the small modular function to find the next root of the Igusa class polynomial modulo the selected small prime number;
(f) checking to determine if all of the roots of the Igusa class polynomial modulo the selected small prime are computed; and
(g) if not, repeating process actions (d) through (f) until all roots are computed;
(h) constructing a new Igusa class polynomial from the computed roots;
(i) adding the new Igusa class polynomial to a set of Igusa class polynomials; and
applying a Chinese remainder approach to construct an Igusa class polynomial over the rational numbers from the computed set of Igusa class polynomials modulo the small primes;
using the selected large prime number and the Igusa class polynomial over the rational numbers to compute a root of the Igusa class polynomial modulo the selected large prime number;
using the computed root to generate a genus 2 curve; and
using the genus curve for a cryptographic application.

2. The computer-implemented process of claim 1, further comprising generating the Igusa class polynomial over the rational numbers from Igusa class polynomials modulo small primes by finding the roots modulo small primes by applying an isogeny computed via a small modular function.

3. The computer-implemented process of claim 2 wherein the small modular function is a rational Siegel modular function.

4. The computer-implemented process of claim 1 wherein the genus 2 curve generates a secret group size.

5. The computer-implemented process of claim 4 wherein the secret group size is the size of a group of points on the Jacobian of the genus 2 curve.

6. The computer-implemented process of claim 5 wherein the secret group size is used to validate software.

7. A computer-implemented process for generating a curve for use in cryptography, comprising:
using a computer to perform the steps of:
selecting a suitable large prime number from a predefined set of large prime numbers;
computing an Igusa class polynomial over the rational numbers from a set of Igusa class polynomials computed modulo a set of small primes, comprising the following process actions:
for a predefined set of small prime numbers,
(a) selecting a small prime number from the predefined set of small prime numbers;
(b) identifying a first root of an Igusa class polynomial modulo the selected small prime;
(c) computing a value of a small modular function using the first root;
(d) applying an isogeny to the small modular function value to find a new value of the small modular function;
(e) using the new value of the small modular function to find the next root of the Igusa class polynomial modulo the selected small prime;
(f) checking to determine if all of the roots of the Igusa class polynomial modulo the selected small prime are computed; and
(g) if all roots are not computed, repeating process actions (d) through (f) until all roots are computed;
(h) constructing a new Igusa class polynomial from the computed roots;
(i) adding the new Igusa class polynomial to a set of Igusa class polynomials;
applying a Chinese remainder approach to construct an Igusa class polynomial over the rational numbers, from the computed set of Igusa class polynomials modulo the small primes;
using the selected large prime number and the Igusa class polynomial over the rational numbers to compute a root of the Igusa class polynomial modulo the selected large prime number;
using the computed root to generate a genus 2 curve; and
using the genus curve for a cryptographic application.

8. The computer-implemented process of claim 7 wherein each root of the Igusa class polynomial modulo the selected small prime is associated with a genus 2 curve and the roots are related by isogenies.

9. The computer-implemented process of claim 8 wherein the roots are related by a (3,3) isogeny.

10. The computer-implemented process of claim 7 further comprising identifying the first root of the Igusa class polynomial modulo the selected prime by performing a single random search.

11. The computer-implemented process of claim 8 wherein the small modular function is a rational Siegel modular function.

12. A system for generating a curve for use with cryptography, comprising:
a general purpose computing device;
a computer program comprising program modules executable by the general purpose computing device, wherein the computing device is directed by the program modules of the computer program to,
for each of a set of small primes,
(a) input a small prime number selected from a predefined set of small prime numbers;
(b) perform a single random search to identify a first root of an Igusa class polynomial modulo the selected small prime number;
(c) compute a value of a small modular function using the first root;
(d) apply an isogeny to the small modular function value to find a new value of the small modular function;
(e) use the new value of the small modular function to find the next root of the Igusa class polynomial;
(f) make a check to determine if all roots of the Igusa class polynomial are computed and repeating (d)-(f) until all roots are computed;
(g) once all roots are computed, construct the Igusa class polynomial from the computed roots;
(h) add the constructed Igusa class polynomial to a set of constructed Igusa class polynomials;
(i) apply a combining approach to find an Igusa class polynomial over the rational numbers using the set of constructed Igusa class polynomials;
randomly select a large prime number selected from a predefined set of large prime numbers;
find a root of the Igusa class polynomial modulo the selected large prime; and use the root of the Igusa class polynomial modulo the selected large prime to find a genus 2 curve to be used in an application.

13. The system of claim 12 wherein the genus 2 curve is used in a cryptography application wherein the genus 2 curve is used to generate a secret group size.

14. The system of claim 12 further comprising generating a cryptographic key using the genus 2 curve.

15. The system of claim 12 further comprising applying a (3,3) isogeny to the value of the small modular function.

16. The system of claim 12 further comprising applying a (5,5) isogeny to the value of the small modular function.

17. The system of claim 12 wherein every root is associated with a genus 2 curve and the roots are related by isogenies.

18. The system of claim 12 wherein the combining approach is a Chinese remainder approach.

19. The system of claim 12 wherein the genus 2 curve is generated using Mestre's algorithm.

* * * * *